US008738201B2

(12) United States Patent
Edwards et al.

(10) Patent No.: US 8,738,201 B2
(45) **Date of Patent: *May 27, 2014**

(54) SYSTEMS AND METHODS OF IMPROVING OR INCREASING INFORMATION CONCERNING, PARTICULARLY, RUNWAY CONDITIONS AVAILABLE TO PILOTS OF LANDING AIRCRAFT

(75) Inventors: Daniel J. Edwards, Burlington, NJ (US); Peter T. Mahal, Berwyn, PA (US); Mark A. Slimko, Crystal Lake, IL (US)

(73) Assignee: Engineered Arresting Systems Corporation, Aston, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,631

(22) Filed: Jun. 8, 2012

(65) Prior Publication Data

US 2012/0262306 A1 Oct. 18, 2012

Related U.S. Application Data

(63) Continuation of application No. 11/957,707, filed on Dec. 17, 2007, now Pat. No. 8,224,507.

(60) Provisional application No. 60/875,655, filed on Dec. 19, 2006.

(51) Int. Cl.
*G06F 19/00* (2011.01)

(52) U.S. Cl.
USPC .......... 701/16

(58) Field of Classification Search
None
See application file for complete search history.

(56) References Cited

U.S. PATENT DOCUMENTS

| | | | |
|---|---|---|---|
| 2,930,026 | A | 3/1960 | Steigerwald |
| 4,404,633 | A | 9/1983 | Goicoechea |
| 4,454,582 | A | 6/1984 | Cleary et al. |
| 5,050,940 | A | 9/1991 | Bedford et al. |
| 5,519,618 | A | 5/1996 | Kastner et al. |
| 5,719,771 | A | 2/1998 | Buck et al. |
| 5,754,965 | A | 5/1998 | Hagenbuch |
| 5,774,070 | A | 6/1998 | Rendon |

(Continued)

FOREIGN PATENT DOCUMENTS

| | | |
|---|---|---|
| DE | 3943318 | 7/1991 |
| EP | 1150266 | 10/2001 |

(Continued)

OTHER PUBLICATIONS

Austrian Examination Report dated Feb. 3, 2010 in related Singapore Application No. 200904113-8.

(Continued)

*Primary Examiner* — Thomas Tarcza
*Assistant Examiner* — Adam Alharbi
(74) *Attorney, Agent, or Firm* — Kilpatrick Townsend & Stockton LLP; Dean W. Russell

(57) ABSTRACT

Addressed are systems and methods for providing to pilots of landing aircraft real-time (or near real-time) information concerning runway conditions and aircraft-stopping performance to be encountered upon landing. The systems and methods contemplate using more objective data than utilized at present and providing the information in automated manner. Information may be obtained by using conventional ground-based runway friction testers or, advantageously, by using air-based equipment such as (but not limited to) unmanned aerospace vehicles (UAVs).

21 Claims, 2 Drawing Sheets

(56) References Cited

U.S. PATENT DOCUMENTS

| | | | | |
|---|---|---|---|---|
| 5,890,079 | A | 3/1999 | Levine | |
| 5,902,345 | A | 5/1999 | Minowa et al. | |
| 5,918,951 | A | 7/1999 | Rudd, III | |
| 5,983,161 | A | 11/1999 | Lemelson et al. | |
| 6,006,146 | A | 12/1999 | Usui et al. | |
| 6,009,356 | A | 12/1999 | Monroe | |
| 6,167,239 | A | 12/2000 | Wright et al. | |
| 6,173,231 | B1 | 1/2001 | Chojnacki | |
| 6,220,676 | B1 * | 4/2001 | Rudd, III | 303/150 |
| 6,278,965 | B1 | 8/2001 | Glass et al. | |
| 6,305,484 | B1 | 10/2001 | Leblanc | |
| 6,308,044 | B1 | 10/2001 | Wright et al. | |
| 6,338,011 | B1 | 1/2002 | Furst et al. | |
| 6,418,369 | B2 | 7/2002 | Matsumoto et al. | |
| 6,434,512 | B1 | 8/2002 | Discenzo | |
| 6,577,943 | B2 | 6/2003 | Nakao et al. | |
| 6,580,997 | B2 | 6/2003 | MacPhail et al. | |
| 6,597,980 | B2 | 7/2003 | Kogure | |
| 6,659,400 | B2 | 12/2003 | Park | |
| 6,720,920 | B2 | 4/2004 | Breed et al. | |
| 6,752,353 | B2 | 6/2004 | Park | |
| 6,760,778 | B1 | 7/2004 | Nelson et al. | |
| 6,816,728 | B2 | 11/2004 | Igloi et al. | |
| 6,876,905 | B2 | 4/2005 | Farley et al. | |
| 7,035,725 | B1 | 4/2006 | Park et al. | |
| 7,069,135 | B2 | 6/2006 | Bertrand | |
| 7,099,752 | B1 | 8/2006 | Lenell et al. | |
| 7,113,852 | B2 | 9/2006 | Kapadia et al. | |
| 7,123,926 | B2 | 10/2006 | Himmelstein | |
| 7,222,507 | B2 | 5/2007 | Wetzel et al. | |
| 7,277,010 | B2 | 10/2007 | Joao | |
| 7,398,146 | B2 | 7/2008 | Bertrand | |
| 7,586,422 | B2 | 9/2009 | Goodman et al. | |
| 7,617,721 | B2 | 11/2009 | McKeown et al. | |
| 7,626,513 | B2 | 12/2009 | Goodman et al. | |
| 7,702,446 | B2 | 4/2010 | Hiwatashi | |
| 7,797,095 | B2 | 9/2010 | Rado | |
| 7,808,377 | B2 | 10/2010 | Shafaat et al. | |
| 7,818,100 | B2 | 10/2010 | Goodman et al. | |
| 7,853,370 | B2 | 12/2010 | Coulmeau et al. | |
| 7,957,878 | B2 | 6/2011 | Rado | |
| 7,970,410 | B2 | 6/2011 | Brinkley et al. | |
| 7,991,516 | B2 | 8/2011 | Matos | |
| 7,991,531 | B2 | 8/2011 | Gowan et al. | |
| 8,044,823 | B2 | 10/2011 | Doherty et al. | |
| 8,060,261 | B2 | 11/2011 | Goodman et al. | |
| 8,116,989 | B2 | 2/2012 | Journade et al. | |
| 8,152,246 | B2 | 4/2012 | Miller et al. | |
| 8,224,507 | B2 | 7/2012 | Edwards et al. | |
| 2003/0025035 | A1 | 2/2003 | Park | |
| 2004/0069902 | A1 | 4/2004 | Park | |
| 2005/0107938 | A1 | 5/2005 | Wetzel et al. | |
| 2006/0243857 | A1 * | 11/2006 | Rado | 244/111 |
| 2007/0132311 | A1 | 6/2007 | Giazotto | |
| 2007/0203633 | A1 | 8/2007 | Johnsen | |
| 2008/0030073 | A1 | 2/2008 | Goodman et al. | |
| 2008/0236268 | A1 | 10/2008 | McKeown et al. | |
| 2009/0125168 | A1 | 5/2009 | Voisin | |
| 2009/0125169 | A1 | 5/2009 | Edwards et al. | |
| 2009/0267798 | A1 * | 10/2009 | Goodman et al. | 340/945 |
| 2009/0292433 | A1 | 11/2009 | Goodman et al. | |
| 2010/0027461 | A1 | 2/2010 | Bothorel | |
| 2010/0079308 | A1 | 4/2010 | Fabre et al. | |

FOREIGN PATENT DOCUMENTS

| | | |
|---|---|---|
| GB | 2480716 | 11/2011 |
| JP | 2003006799 | 1/2003 |
| JP | 2003187371 | 7/2003 |
| JP | 2004264177 | 9/2004 |
| SG | 153394 | 1/2012 |
| WO | 03101831 | 12/2003 |
| WO | 2008048393 | 4/2008 |
| WO | 2008127468 | 10/2008 |
| WO | 2010019045 | 2/2010 |
| WO | 2011119634 | 9/2011 |

OTHER PUBLICATIONS

"Chicago Runway Too Slick at Crash", http://www.usatoday.com/news/nation/2006-03-01-slick-runway_x.htm.

"Concept of Operations for the Next Generation Air Transportation System," Joint Planning and Development Office, Version 2.0 bearing the date Jun. 13, 2007.

International Search Report mailed Jan. 16, 2009 in connection with International Patent Application No. PCT/US2007/087733.

"Overrun Aversion," Aviation Week & Space Technology, pp. 36-37, Jul. 6, 2009.

"Turbulence Auto-PIREP System (TAPS)," AeroTech Research (U.S.A.), Inc., ATR-2007-17WP14 bearing dates © 2008 and Oct. 2007.

"Weather Concept of Operations," Joint Planning and Development Office, Version 1.0 bearing the date May 13, 2006.

* cited by examiner

SYSTEMS AND METHODS OF IMPROVING OR INCREASING INFORMATION CONCERNING, PARTICULARLY, RUNWAY CONDITIONS AVAILABLE TO PILOTS OF LANDING AIRCRAFT

REFERENCE TO PROVISIONAL APPLICATION

This application is a continuation of U.S. patent application Ser. No. 11/957,707 filed Dec. 17, 2007, allowed, which is based on and hereby refers to U.S. Provisional Patent Application Ser. No. 60/875,655, filed Dec. 19, 2006, and having the same title as appears above, the entire contents of both of which are incorporated herein by this reference.

FIELD OF THE INVENTION

This invention relates to information or data gathering and communication and, more particularly (although not exclusively) to automated systems (including equipment) and methods for providing to pilots of landing aircraft real-time (or near real-time) information concerning runway conditions and aircraft-stopping performance to be encountered upon landing.

BACKGROUND OF THE INVENTION

Sensors on-board most commercial aircraft routinely measure certain performance parameters and configuration characteristics of the aircraft during take-off, landing, and flight. Data corresponding to the measurements typically are recorded, or otherwise captured, for subsequent review and evaluation should the need arise. One recording mechanism is generally denoted the “flight data recorder” or “black box,” and has as a design objective surviving a catastrophic failure of the aircraft in which it is placed. Quick access recorders (QARs) or other devices or systems additionally may be used.

Information captured by flight data or other recorders in some commercial aircraft is not always transmitted to any device external to the associated aircraft. U.S. Pat. No. 6,009,356 to Monroe, however, contemplates transmitting certain of the captured information “to ground control stations for real time or near real time surveillance.” See Monroe, Abstract, ll. 7-8. According to the Monroe patent, a “ground tracking station will have the capability of interrogating the in flight data while the aircraft is in flight.” See id., col. 3, ll. 35-37. For at least some other aircraft, recorded information may at times be transmitted for maintenance purposes or in connection with flight operation quality assurance (FOQA) programs.

Shortcomings in assessing braking conditions for landing aircraft have contributed to numerous crashes or other collisions. For more than twenty-five years, recommendations of the U.S. National Transportation Safety Board (NTSB) to the U.S. Federal Aviation Administration (FAA) have mentioned issues with braking action and runway friction. Notwithstanding these multiple recommendations, there remains today a void in fulfilling the need for real-time performance of landing aircraft.

Past recommendations of the NTSB have included proposing to use INS/INU (Inertial Navigation System/Inertial Navigation Unit) data to measure deceleration and on-board equipment for quantitative reports on braking coefficients and analytically derived data for correlation to runway surface conditions. Some progress has been made in this area, although inaccuracies in ground-based friction device measurements and different characteristics of different aircraft types have raised questions about accuracy of analytically-derived friction values. These likely inaccuracies (or, at minimum, imprecisions) cause apprehension among airframe manufacturers and airlines, as potential economic impact of operating aircraft at lower weights than necessary because of inaccurate (or imprecise) calculated friction values is great. Likewise, and perhaps more importantly, the industry may have determined that this margin of error presents unacceptable safety risk. Accordingly, adoption of these past NTSB recommendations does not appear imminent.

Hence, no current (or even currently-anticipated) system provides objective information concerning landing conditions encountered by one aircraft to pilots of subsequently-landing aircraft. Instead, most airports continue to use mechanical, ground-based friction testing devices to collect information. Additionally, subjective reports from landed pilots may be passed, via air traffic controllers or dispatchers, to pilots of landing aircraft. These apparently are the types of reports available to pilots of Southwest Airlines Flight No. 1248 on Dec. 8, 2005, which flight departed the end of a runway and left the airfield boundary at Midway International Airport in Chicago, Ill. As noted by *USA Today*, the pilots “assumed the runway was in ‘fair’ condition, based on reports from other pilots radioed to them by air traffic controllers.” However, subsequent analysis of objective data “show[ed] the conditions were ‘poor’ at best,” with the runway “so slippery that it would have been difficult for people to walk on, providing minimal traction for the jet’s tires as pilots tried to slow down . . . .” See “Chicago Runway Too Slick at Crash,” http://www.usatoday.com/news/nation/2006-03-01-slick-runway_x.htm.

Indicated by *USA Today* is that

> [t]he accident . . . raises national safety implications because it shows that the system of testing slick runways has potentially fatal flaws. Without accurate information about runway conditions, pilots can stumble into danger without warning . . . .
>
> The [FAA] says it wants a better way for checking slick runways, but argues that it has not found a system that is reliable for all aircraft.

Id. Indeed, according to staff of the NTSB, development of such a system is unlikely for at least the next several years.

The FAA is, however, promoting its “NextGen” initiative, a tenet of which includes advanced weather forecasting around problem areas or regions. Current efforts are aimed principally toward reducing flights delays caused by lines of thunderstorms. Nevertheless, other poor-weather scenarios, such as restricted runway operations (particularly during winter), conceivably might merit attention as part of the initiative. For example, among future capabilities proposed for certain airports with high densities of flights (so-called “super-density ops”) is automated distribution of runway braking action reports, which distribution arguably could be used to render greater certainty in determining when runway operations must be restricted.

SUMMARY OF THE INVENTION

A. Systems and Methods

The present invention provides systems and methods for providing to pilots or other operators of landing aircraft real-time (or near real-time) information concerning runway conditions and aircraft-stopping performance to be encountered upon landing. In certain versions of the invention, information relevant to braking effectiveness of a just-landed aircraft is transmitted, together with (at least) the type of aircraft, to pilots scheduled for subsequent landings on the same (or possibly a nearby) runway. Such information may be obtained from any or all of flight data recorders, quick access recorders, or FOQA capabilities and may be subject to processing prior to its transmission to pilots of soon-to-land aircraft. This is particularly likely, although not necessarily mandatory, when different types of aircraft are involved, as braking effectiveness of one type of aircraft for specified runway conditions may not correlate completely with effectiveness of a different type of aircraft encountering similar conditions. Regardless, however, of value in connection with the invention is automated provision to pilots of objective information concerning conditions they are likely to encounter.

Because weather conditions may change materially over short intervals of time, the usefulness of braking effectiveness information is enhanced if it may be made available promptly after having been gathered. Hence, compiling and processing such information quickly is desirable. To this end, some embodiments of the invention contemplate using information already being obtained (or already obtainable) for recordal by aircraft flight data or other recorders. Further, some versions of the invention may utilize computer programs or simulations designed to convert information gathered by one type of aircraft to information useful to pilots of a different type of aircraft. Preferably, relevant information is made available as instantaneously as possible, although delays of approximately thirty (30) minutes—or even longer—may be tolerated when conditions are not changing more rapidly.

Braking effectiveness information may include, but need not be limited to, information concerning aircraft type, weight, and center of gravity, aircraft speed as a function of time, when braking commenced relative to aircraft touch down, where braking commenced relative to a given runway position, and when and where reverse thrust or certain flaps or spoilers were deployed. Other information potentially useful to obtain may include time and place of touch down, aircraft weight, standard landing gear configuration, brake application speed, type of braking-ABS setting, anti-skid operations (to include brake pressure commanded by the pilot's brake pedals and the pressure delivered to the braked after anti-skid control computer calculations), aircraft stopping point, flap/slat settings, landing gear configuration, and first nose wheel tiller movement past normal nose wheel displacement during landing to indicate termination of landing ground roll and commencement of the taxi phase. Further possibly-useful information may include deceleration rates gathered from INU decelerometers as well as the time and distance of the deceleration to assist in ground roll distance computations. Yet additional information potentially useful to obtain is whether any equipment of the aircraft is placarded inoperative or degraded per the minimum equipment listing (MEL), whether anti- or de-icing systems were in use, and weather-related information including (but not limited to) winds aloft (speed and direction), windshear detection, temperature, etc. If not measured or obtained on-board an aircraft (by, as a non-limiting example, the aircraft anti-skid controller), some or all of the information may be measured by ground-based (or other) equipment. Any such measurements also may be utilized to verify information measured on-board the aircraft.

If desired, data processing may occur at a centralized facility, although processing may alternatively occur elsewhere. Dissemination of processed data may occur via ACARS (the Aircrew Communication Addressing and Reporting System, ATIS (the Automatic Terminal Information Service), or other ground-to-cockpit communications channels. The data additionally preferably may be available to participants in airfield and airline operations, air traffic controllers, and flight crews, with copies stored for historical purposes or analysis. If appropriate, the data should be afforded protections normally provided safety information. The data further may be supplemented with ground-based information such as depth of contamination, current weather conditions, precipitation intensity, time of last runway plowing, location of last runway plowing in relation to distance from runway centerline, and salting/chemical treatment of runway. At least some of this supplemental information soon may be available in automated reports using technologies of airport communications integrators.

Although satisfying the FAA's need for "better way[s] for checking slick runways" is a principal objective of the invention, the invention is not limited to satisfying this particular need. Rather, the invention may be applicable to providing information to operators of other vehicles including, but not limited to, ships, trains, buses, automobiles, and helicopters. The provided information thus obviously need not necessarily relate (or relate solely) to braking effectiveness on runways, but instead could possibly relate to docking outcomes, rail conditions, or roadway braking effectiveness, for example. Maritime usage of on-board information could be supplemented by data from weather buoys or other instruments. Likewise, take-off data for departing aircraft could be provided as well with a transmission trigger of thirty-five foot AGL or other suitable event (including but not limited to elapsed time or reduction from take-off thrust). This trigger, along with geographic coordinates, could enable formulation of take-off distance for the aircraft.

Comparisons of recorded/transmitted data to nominal values additionally may occur during processing. For example, actual landing distances (whether measured or calculated from measured data) may be compared for a specific aircraft type to nominal values for dry runway settings, with the comparative information being made available to pilots of aircraft scheduled for landing. Comparisons with other aircraft type similarly may be made and provided to pilots.

Information transmitted to landing pilots in connection with the invention, together with aircraft flight and performance manuals, are likely to provide more useful data to these pilots at critical times during their flights. The information and data are intended to be more objective than current information passed verbally from pilot to pilot via human air traffic controllers. They also are intended to be available in real-time (or near real-time) to enhance their usefulness.

B. Data Gathering Equipment

Current runway friction measurement methods rely on friction coefficients measured by ground-based decelerometers. Although some correlation likely exists between these measured friction coefficients and aircraft braking coefficients, they are not well correlated with aircraft performance data derived from actual manufacturer flight testing. Hence, the runway friction coefficients measured using ground-based equipment are not typically used by pilots when referencing flight operations manuals (FOMs), quick reference handbooks (QRHs), aircraft/airplane flight manuals (AFMs), or on-board performance computers (OPCs) to accomplish performance calculations for take-offs and landings.

As an alternative to using ground-based measuring equipment, versions of the present invention contemplate using aircraft instead. Especially preferred for obtaining measurements are unmanned aerospace vehicles (UAVs), which may be flown into traffic patterns at airports and landed—multiple times if necessary—to obtain both airborne weather data and data relating to runway conditions. At least because the UAVs are airframes (and thus subject to or creating aerodynamic forces such as lift and drag), the runway friction information they obtain is likely to represent more accurately data needed by pilots of to-be-landed aircraft. In particular, the UAVs may if desired provide baseline data for conversion to most or all other types of (fixed-wing) aircraft, supplying information about percentage increases over dry landing distances noted in the FOMs, QRHs, AFMs, or OPCs, for example.

Furthermore, when an airport is experiencing snow, the UAVs may be used to determine snow removal effectiveness without closing the airport runways (as occurs now). Past NTSB safety recommendations have called for a value to determine when a runway should be closed. Data obtained via use of the UAVs could provide baseline information for that value and how it should be determined.

An airport could, if desired, possess one or more UAVs available to assess runway conditions at any given time. Alternatively, a single UAV could service more than one airport, flying among airports and landing and taking-off at each. Yet alternatively, fleets of UAVs could remain on-call at various locations and flown into traffic patterns and landed as needed.

Desirably, the UAVs would include anti-skid braking and sufficient computing power to measure and process needed data. They additionally conceivably could be modified to resemble more closely particular types of aircraft. For example, some UAVs might be modified to incorporate landing gear brake assemblies of the types used by Boeing, while others might be modified to include assemblies of the type used by Airbus (or Bombardier, Embraer, Saab, Fokker, etc.).

The UAVs or other air-based data-gathering equipment may, in some embodiments of the invention, transmit weather, runway, and performance data to multiple airlines operating at location via a (secured) shared network. If the data is not aircraft-type specific, conversions for specific aircraft types may be made by the various airlines. Alternatively, the data may be transmitted centrally at a particular site or to manufacturers, the FAA, or otherwise. To the extent necessary or desirable, security assurances may be included to protect information deemed proprietary to a user from being accessed by at least certain other users.

It thus is an optional, non-exclusive object of the present invention to provide systems and methods of improving or increasing information concerning runway conditions.

It is another optional, non-exclusive object of the present invention to provide systems and methods of furnishing automated, objective information to pilots substituting for subjective information currently conveyed verbally.

It also is an optional, non-exclusive object of the present invention to provide systems and methods of real-time (or near real-time) information concerning runway conditions and aircraft-stopping performance likely to be encountered under landing.

It is a further optional, non-exclusive object of the present invention to provide systems and methods of obtaining runway-related data using aircraft as measuring instruments.

It is, moreover, an optional, non-exclusive object of the present invention to provide systems and methods using UAVs to obtain runway-related data.

Other objects, features, and advantages of the present invention will be apparent to those skilled in the relevant art with reference to the remaining text and drawings of this application.

DETAILED DESCRIPTION

Figure 1:
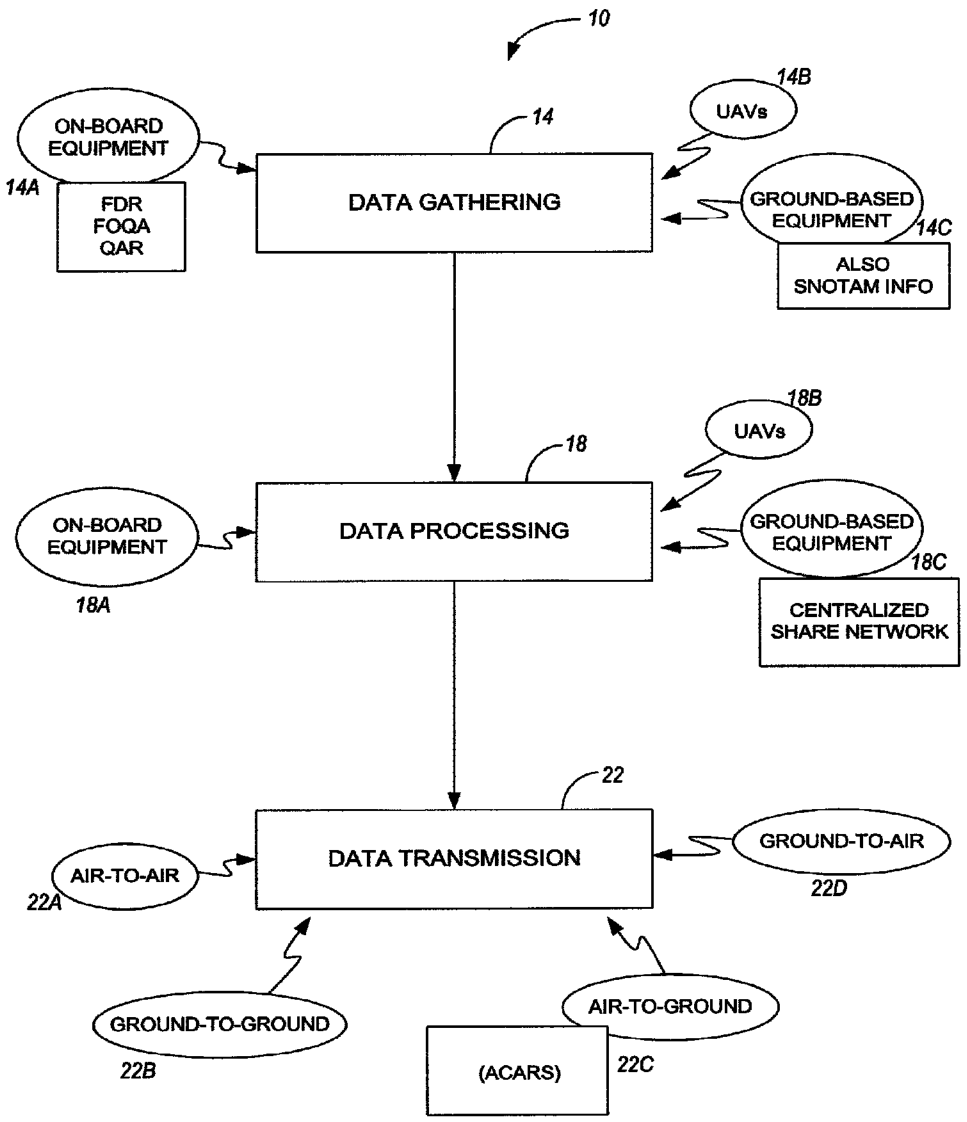
FIG. 1 is a flow chart of certain optional actions and equipment used or useful in connection with various versions of the invention.

Illustrated in FIG. 1 are optional aspects of system 10. Typically to be effected by system 10 are actions including gathering (block 14), processing (block 18), and transmitting (block 22) data relating directly or indirectly to, for example, runway conditions and aircraft braking. As noted in preceding sections of this application, activities such as those identified in FIG. 1 may be accomplished using either air- or ground-based equipment (or both).

In particular, data gathering (14) may occur utilizing any or all of equipment on-board manned aircraft (14A) that recently landed at or departed an airport, equipment on-board unmanned aircraft such as UAVs (14B), and ground-based equipment (14C), including but not limited to conventional ground-based runway friction testers. Preferably, though, such conventional friction testers are not employed, both because doing so requires closure of a runway and because their results are not likely to correlate as well with those of air frames. Alternatively or additionally, information may be obtained from Snow Warning to Airmen (SNOTAM/SNOWTAM) reports providing airfield conditions such as time of last runway plowing, depth of snow or slush, whether de-icing equipment is in use, etc.

As with gathering of data, processing of data (18) may occur on-board manned aircraft (18A), on-board unmanned aircraft (18B), or using ground-based computing equipment (18C). Combinations of these processor options may be utilized as well. Centralizing data processing may be advantageous at certain airports, or in certain situations, while decentralized processing may be beneficial at other locations or times.

Data transmission (22) preferably occurs automatically to any needed locales. Pilots of to-be-landed aircraft, for example, may receive data directly from other airborne equipment (22A) or via ground-to-air transmissions (22D). As another example, pilots of aircraft scheduled for take-off may receive data from ground-based transmitters (22B) or airborne ones (22C).

Figure 2:
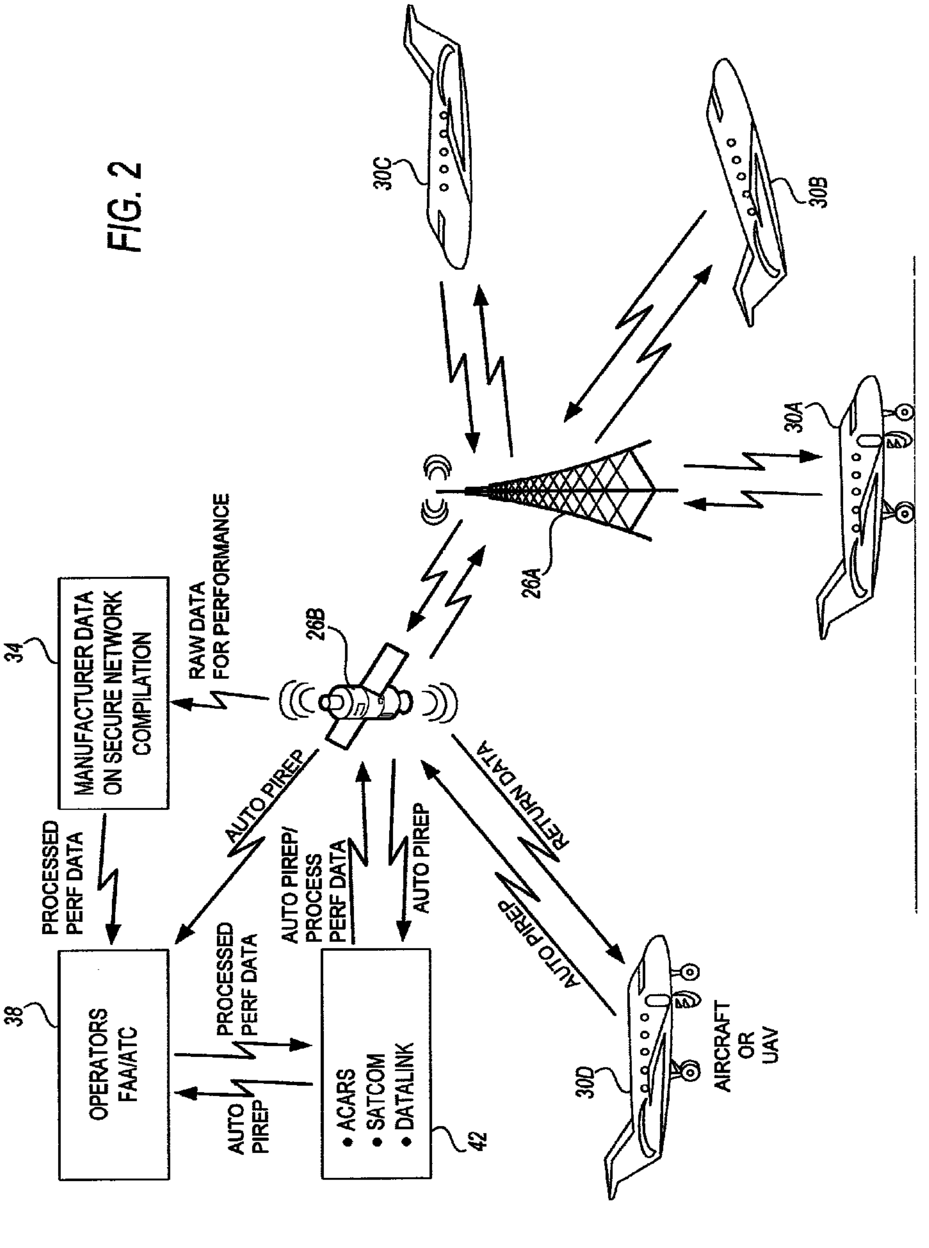
FIG. 2 is a schematic representation of various aspects of the invention.

FIG. 2 likewise details selected optional aspects of system 10. Either or both of ground-based (26A) and airborne (26B) transceivers or repeaters may be employed to pass data or other information from or to aircraft, including recently-landed aircraft (30A), recently-departed aircraft (30B), in-flight aircraft (30C), and aircraft preparing for landing (30D). Any of aircraft 30A-D may be manned or unmanned, private or commercial, government or civilian, or otherwise. Unprocessed or partially-processed data may be compared to or otherwise processed (34) in connection with data provided by airframe manufacturers or others. In some versions of system 10, processed data may be forwarded to any or all of airlines, airport authorities, the FAA, and air traffic control (ATC) (38) and to pilots via ACARS, SATCOM, DATALINK, or otherwise (42). The result is a system that may supply automated pilot reports (designated "AUTO PIREP" in FIG. 2) containing objective, data-based information that, particularly (although not necessarily) when coupled with aircraft flight manuals and performance manuals, furnishes pilots with higher-quality assessments of conditions to be expected upon, especially, landing at a particular location.

The present invention is flexible as to equipment and actions comprising the systems and methods. Hence, the foregoing is provided for purposes of illustrating, explaining, and describing embodiments of the present invention. Modifications and adaptations to these embodiments will be apparent to those skilled in the art and may be made without departing from the scope or spirit of the invention. Advantageously, however, the invention will provide real-time, or near real-time, objective data concerning runway conditions and, for pilots of to-be-landed craft, aircraft-stopping performance likely to be encountered upon landing. The disclosure of U.S. Patent Application Publication No. 2006/0243857 of Rado is incorporated herein in its entirety by this reference.

What is claimed is:

1. A method of providing runway-related information to an operator of an aircraft A approaching a runway for landing or take-off, such runway-related information being generated in connection with travel of another aircraft B along at least a portion of the runway, the method comprising:

(a) electronically gathering runway-related information based on the travel of aircraft B along at least the portion of the runway, the runway-related information comprising (i) brake pressure commanded by an operator of aircraft B and (ii) brake pressure delivered to the brakes after anti-skid control computer calculations are performed on-board aircraft B; and (b) transmitting, within thirty minutes after aircraft B travels along at least the portion of the runway, at least some of the gathered runway-related information relating to commanded and delivered brake pressures to aircraft A for evaluation by the operator for the purpose of deciding whether to land on or take-off from the runway.

2. A method according to claim 1 in which the act of transmitting at least some of the gathered runway-related information to aircraft A for evaluation by the operator occurs while aircraft A is airborne.

3. A method according to claim 2 in which the act of transmitting at least some of the gathered runway-related information to aircraft A for evaluation by the operator occurs while aircraft A is approaching the runway for landing.

4. A method according to claim 1 in which at least some of the gathered runway-related information is recorded on-board aircraft B.

5. A method according to claim 1 in which the operator of aircraft B is a human pilot on-board aircraft B.

6. A method according to claim 1 in which aircraft B is unmanned.

7. A system for providing runway-related information to an operator of an aircraft A approaching a runway for landing or take-off, such runway-related information being generated in connection with travel of another aircraft B along at least a portion of the runway, the system comprising:

(a) means for electronically gathering runway-related information based on the travel of aircraft B along at least the portion of the runway, the runway-related information comprising (i) brake pressure commanded by an operator of aircraft B and (ii) brake pressure delivered to the brakes after anti-skid control computer calculations are performed on-board aircraft B; and (b) means for transmitting, within thirty minutes after aircraft B travels along at least the portion of the runway, at least some of the gathered runway-related information relating to commanded and delivered brake pressures to aircraft A for evaluation by the operator for the purpose of deciding whether to land on or take-off from the runway.

8. A system according to claim 7 in which the means for transmitting at least some of the gathered runway-related information to aircraft A for evaluation by the operator comprises means for transmitting at least some of the gathered runway-related information while aircraft A is airborne.

9. A system according to claim 8 in which the means for transmitting at least some of the gathered runway-related information to aircraft A for evaluation by the operator comprises means for transmitting at least some of the gathered runway-related information while aircraft A is approaching the runway for landing.

10. A system according to claim 7 in which at least some of the gathered runway-related information is recorded on-board aircraft B.

11. A system according to claim 7 in which the operator of aircraft B is a human pilot on-board aircraft B.

12. A system according to claim 7 in which aircraft B is unmanned.

13. A method of providing surface-related information to an operator of a first vehicle approaching a surface for purposes of travel, comprising:

(a) causing a second vehicle, of the same type as the first vehicle, to travel along at least a portion of the surface;

(b) electronically gathering surface-related information based on the travel of the second vehicle along at least a portion of the surface, the surface-related information comprising (i) brake pressure commanded by an operator of the second vehicle and (ii) brake pressure delivered to the brakes after anti-skid control computer calculations are performed on-board the second vehicle; and (c) transmitting, within thirty minutes after the second vehicle travels along at least the portion of the surface, at least some of the surface-related information relating to commanded and delivered brake pressures to the first vehicle for evaluation by the operator of the first vehicle for the purpose of deciding whether to travel along the surface.

14. A method according to claim 13 in which the first and second vehicles are ground-based motor vehicles and the surface is a roadway.

15. A method according to claim 13 in which the first and second vehicles are trains and the surface comprises a railway.

16. A method according to claim 13 in which the first and second vehicles are boats and the surface comprises a waterway.

17. A method according to claim 1 in which the act of electronically gathering runway-related information comprises gathering ground roll distance of aircraft B along the runway.

18. A method according to claim 17 further comprising transmitting to aircraft A comparative information relating to the ground roll distance of aircraft B and a nominal ground roll value for the type of aircraft B on a dry runway.

19. A method according to claim 1 in which the act of transmitting at least some of the gathered runway-related information to aircraft A for evaluation by the operator comprises transmitting to aircraft A the type of aircraft B.

20. A method according to claim 1 further comprising also transmitting at least some of the gathered runway-related information to at least one organization selected from the group consisting of: air traffic controllers, the Federal Aviation Administration, airlines, and airport authorities.

21. A method of providing runway-related information to an operator of an aircraft, comprising:

(a) electronically gathering, on-board a landing aircraft, information relevant to braking effectiveness of the landing aircraft along a runway, such information including deceleration rates of the landing aircraft;

(b) electronically processing at least some of the braking-effectiveness information including at least some of the deceleration rates, at least some of the electronic processing (i) occurring on-board the landing aircraft and (ii) comprising computing an anticipated ground roll distance for the landing aircraft; and (c) transmitting, within thirty minutes after the landing aircraft travels along at least the portion of the runway, at least some of the electronically-processed information to an airborne aircraft approaching the runway for landing.

* * * * *